J. A. FIRSCHING.
PROPORTIONAL SPACER DEVICE.
APPLICATION FILED FEB. 16, 1911.
1,062,700.
Patented May 27, 1913.
2 SHEETS—SHEET 1.
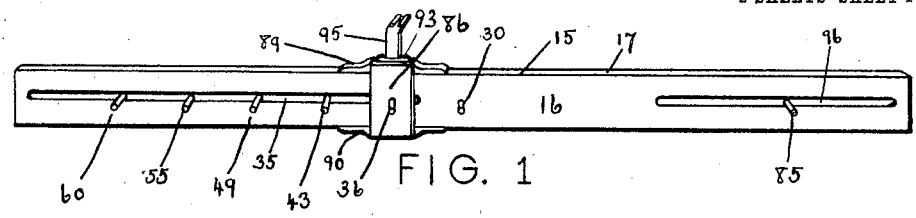
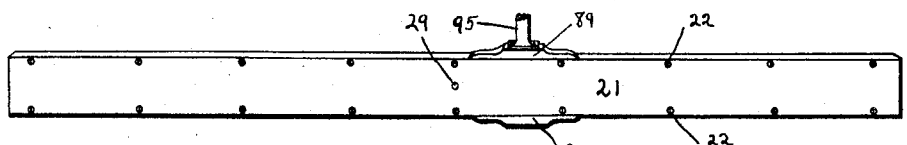
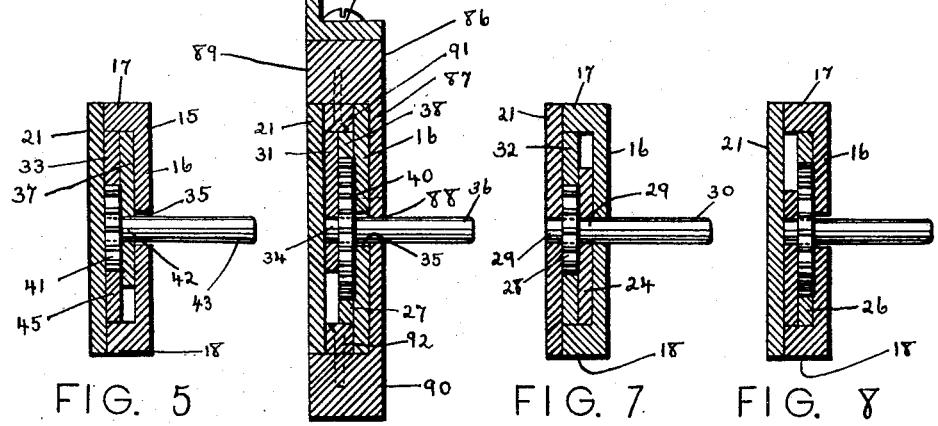
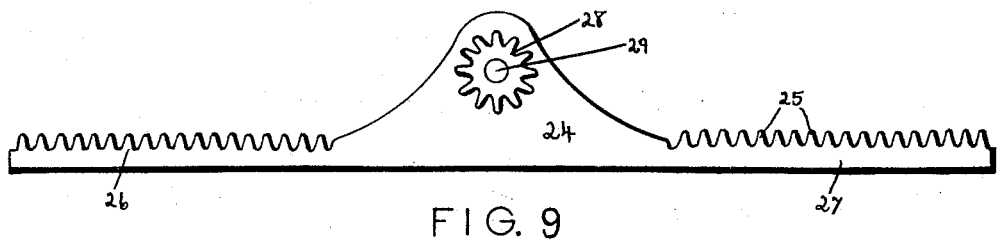
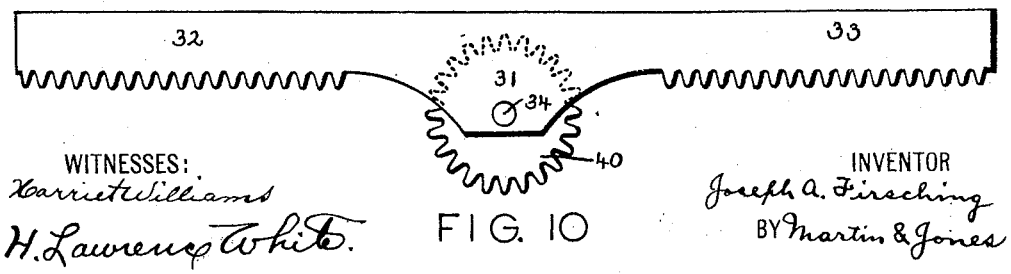
WITNESSES:
Harriet Williams
H. Lawrence White
INVENTOR
Joseph A. Firsching
BY Martin & Jones
ATTORNEYS J. A. FIRSCHING.
PROPORTIONAL SPACER DEVICE.
APPLICATION FILED FEB. 16, 1911.
1,062,700.
Patented May 27, 1913.
2 SHEETS—SHEET 2.
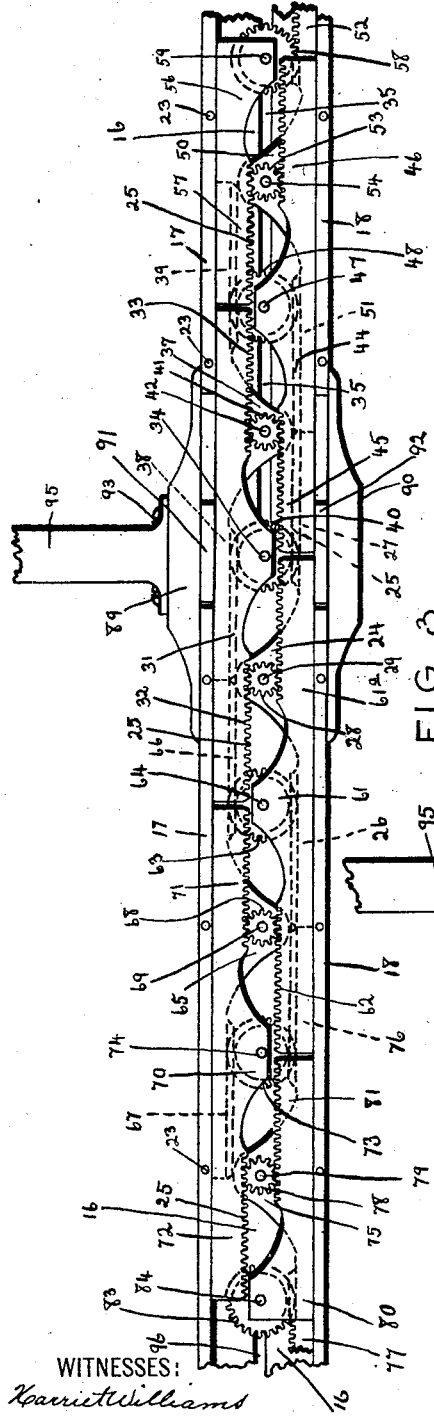
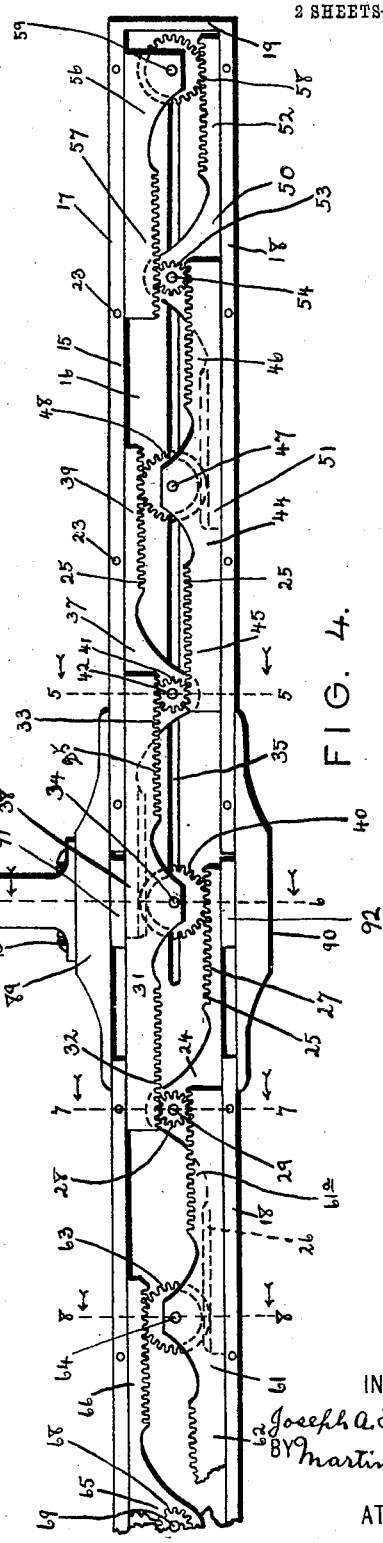
WITNESSES:
Harriet Williams
H. Lawrence White.
INVENTOR
Joseph A. Firsching
BY Martin & Jones
ATTORNEYS

UNITED STATES PATENT OFFICE.

JOSEPH A. FIRSCHING, OF UTICA, NEW YORK.

PROPORTIONAL-SPACER DEVICE.

1,062,700.  Specification of Letters Patent.  Patented May 27, 1913.

Application filed February 16, 1911. Serial No. 603,965.

*To all whom it may concern:*

Be it known that I, JOSEPH A. FIRSCHING, of Utica, in the county of Oneida and State of New York, have invented certain new and useful Improvements in Proportional-Spacer Devices; and I do hereby declare that the following is a full, clear, and exact description thereof, which will enable others skilled in the art to which it appertains to make and use the same, reference being had to the accompanying drawings, and to the reference-numerals marked thereon, which form part of this specification.

The purpose of my present invention is to provide a proportional spacing device of new and improved construction.

In a great variety of the trades and crafts it is necessary to have a spacing device which will automatically space off a given fractional part of a distance, which distance and the fractional part thereof may be continually changing with the different articles. For the sake of clearness, in showing the operation and necessary features of such a spacing device, I will describe how such a device is used in one particular way, without limiting my device to that use alone, as it will be obvious that the device is adapted for a great variety of uses in many different arts or trades.

In the manufacture of certain classes of underwear the space to be closed by means of buttons and button-holes will vary both in the different sizes and also in the different garments of the same size and this space may also be fitted with a varying number of buttons and button-holes according to the class of goods. However the total space and number of buttons and button-holes may vary, it is desired that the buttons and button-holes be spaced an equal distance apart on the individual garment or in other words, they will divide the entire space into equal fractional parts. For instance a union undergarment of a given general size may have an opening of from 23 to 25 inches to be fitted out with eight buttons. If the buttons were placed invariably three inches apart there would be a space at the end reached last of from two inches to four inches which variation would be very noticeable. By using a proportional spacer, this distance is divided into eight equal parts and the variance of the total length from the standard length is not noticeable as the excess or lack is divided along the whole length and there is no part inadequately nor over supplied with buttons. Heretofore the usual form of these proportional spacers, has been that of two series of lever crossing each other and pivotally mounted upon each other so that they could be expanded and contracted after the manner of the collapsible gates of elevators. This form of spacer has various disadvantages among which may be particularly mentioned its great width, on account of the length of levers necessary to obtain the desired amount of possible motion. This great width makes a spacer of that class often too large for convenient use as it occupies valuable space, namely between the operator and the table upon which the real work is to be done. My improved proportional spacer obviates this and many other disadvantages and has various advantages of its own as will be more fully pointed out hereafter. In general, my device is constructed of a series of racks and pinions so proportioned, arranged and connected as to obtain the desired ratio of movement of successive parts as to form a proportional spacer.

Figure 1 is a front perspective view of my proportional spacer. Fig. 2 is a back perspective view of the same. Fig. 3 is a back elevation on an enlarged scale of a portion of the spacer with the back cover removed, and with the racks in contracted position. Fig. 4 is a similar view with the racks in extended position. Figs. 5, 6, 7 and 8 are perpendicular sectional view on lines 5—5, 6—6, 7—7 and 8—8 respectively of Fig. 4, but on a still more enlarged scale. Fig. 9 is a plan view of one of the narrow racks and its small pinion on the same scale as Figs. 5-8. Fig. 10 is a plan view of one of the wide racks and its large pinion on the same scale as Figs. 5-9.

Referring to the drawings in a more particular description 15 is the rectangular casing in the form of a long shallow box, composed of a front 16, sides 17 and 18, and ends 19, to which casing is secured the back cover 21 by suitable means as by screws 22 extending through the back cover and threaded into holes 23 in the sides 17 and 18. Midway lengthwise of the casing 15 there is provided and securely located a rack plate 24 resting against the front 16 of the casing and having its extended ends resting against the lower side 18 and provided with teeth 25 on the edge toward the center of the casing to form narrow racks 26 and 27 to the left and right respectively as viewed in Figs. 3 and 4. The central part of the rack plate 24 is wider than the racks at its ends and extends upward past the center crosswise of the casing. Upon this wide part rests a small pinion 28 loosely mounted upon a stub shaft 29 which is secured in the rack plate 24 and the front end of which shaft projects through a hole in the front 16 of the casing and thereby holds the rack plate 24 fixedly in place in the casing and its front projecting end 30 also serves to locate the fixed center of the spacer and is used as a handle as shown hereafter. The rear end of this stub shaft 29 also projects into a hole in the back cover 21 in order to more rigidly secure the rack plate 24 in place against any movement.

In the casing 15 and to the right of the rack plate 24, as viewed in Figs. 3 and 4, there is provided a sliding rack plate 31 having its ends provided with teeth 25 on the edge toward the center of the casing to form a rack 32 at the left end and a rack 33 at the right end. This rack plate 31 rests against and slides upon the upper side 17 of the casing and is upon the plane of the small pinion 28 with which the rack 32 engages. The racks 32 and 33 are wider than the racks 26 and 27, that is, the former extend farther toward the center of the casing than the latter and for this reason I will for the sake of convenience and brevity call the racks 32 and 33 and similarly formed members, wide racks; while I will call racks 26 and 27 and similarly formed members, narrow racks. The central portion of the rack plate 31 extends beyond the center of the casing crosswise and at the point central of the casing is provided with a stub shaft 34 projecting through and beyond the front 16 of the casing 15, upon which stub shaft there is loosely mounted between the rack plate 31 and the front 16 of the casing a large pinion 40 which is on the plane of the narrow rack 27 and engages therewith. The end of the stub shaft 34 projects through a slot 35 in the front of the casing and forms a handle 36 on the front of the spacer. This slot 35 extends along the center of the front 16 of the casing from a point near the handle 30 to a point near the left end of the spacer as seen in Fig. 1 or the right end of the spacer as seen in Figs. 3 and 4.

To the right of rack plate 31 as seen in Figs. 3 and 4, there is provided and located a sliding rack plate 37 similar in construction to rack plate 24, and having narrow racks 38 and 39 at its left and right ends respectively, similar to racks 26 and 27. This rack plate 37 rests and slides upon the upper side 17 of the casing and upon the front 16 of the casing while its rack 38 extends between the front 16 and the rack plate 31 and engages the large pinion 40. At the central portion of the rack plate 37 and at a point thereon which is at the center of the casing crosswise, there is loosely mounted a small pinion 41 on a shaft 42 which is securely fixed in the rack plate 37 and projects therethrough and through the slot 35 in the casing to form a handle 43 on the front of the spacer. The small pinion 41 is on the plane of and engages the rack 33 of the rack plate 31. Still farther to the right as seen in Figs. 3 and 4, there is provided and located a rack plate 44 similar in construction to rack plate 31 and having wide racks 45 and 46 at its left and right ends respectively similar to racks 32 and 33 and having a large pinion 48 similar to pinion 40 and similarly mounted upon the rack plate 44 upon a stub shaft 47 the end of which projects through the slot 35 in the front of the casing to form a handle 49 on the front of the spacer. The wide rack 45 is on the plane of and engages the small pinion 41. The large pinion 48 is on the plane of and engages the narrow rack 39. This rack plate 44 rests and slides upon the lower side 18 of the casing. Still farther to the right as viewed in Figs. 3 and 4, there is provided and located a rack plate 50 similar in construction to rack plate 24 and having narrow racks 51 and 52 at its left and right ends respectively similar to racks 26 and 27 and having a small pinion 53 similar to pinion 28 and similarly loosely mounted upon a stub shaft 54 secured to said rack plate 50 is a small pinion 53 which engages with the wide rack 46. The shaft 54 projects through the rack plate 50 and through the slot 35 in the front of the casing to form a handle 55 on the front of the spacer. This rack plate 50 is on the plane of the large pinion 48 and the narrow rack 51 engages therewith. This rack plate 50 rests and slides upon the front 16 and the lower side 18 of the casing. Further movable rack and pinion members may be provided extending farther to the right as far as desired but I will not describe or illustrate them further than to say that they would now be, as to construction, arrangement and operation, simply duplicates successively of rack plates 31, 37, 44 and 50 and their attached racks and pinions.

The method of bringing the series of movable racks and pinions to an end is shown by rack plate 56 at the right of rack plate 50 and which is similar in construction and arrangement to rack plate 31 except that it has only the left hand wide rack 57 which engages small pinions 53 while the large pinion 58 upon this rack plate engages the narrow rack 52. The pinion 58 is loosely mounted on a shaft 59 secured to the rack plate 56 and projecting through the slot 35 to form with its projecting end a handle 60 on the front of the spacer. Assuming as will preferably be the case, that the number of teeth 25 to the inch will be the same on all wide and narrow racks and that all the small pinions will be similar as to size and number of teeth and likewise that all the large pinions will be similar as to size and number of teeth, then the number of teeth on each of the large pinions will be twice the number of teeth on each of the small pinions.

It will be noted that the rack plates having narrow racks, rest and slide against the front 16 of the casing, while the pinions of these rack plates are mounted on the side of the rack plate toward the back cover 21 and are held in place by said cover. It will be understood that the inside depth of the casing from front to back is just sufficient for the racks with their pinions or overlapping racks to slide therein. The large pinions rest against the front of the casing and are held in engagement with the narrow racks, by reason of the rack plates to which said large pinions are attached, being between the wide racks and the front of the casing. Both series of rack plates are of such width at their center as not to obstruct the movement of adjacent rack plates on the same plane. The wide central part of the rack plates such as 24, having narrow racks, extend beyond the small pinions mounted thereon so as to project between the wide racks and the front of the casing and so assist in keeping the wide racks in alinement with the small pinions to be engaged by them.

The part of my proportional spacer so far described would be sufficient to space the fifths of a given distance, and could be used to that extent without any additional racks and pinions. It is however better to have the device capable of spacing off a smaller fractional part than fifths and I will therefore describe the construction of the rest of my device whereby I obtain this result, before I describe in detail the operation of the part already set forth. As previously stated, further sliding racks and pinions may be added to the right of the series already shown and each complete rack and pinion will add another possible fractional division. The same result may be accomplished also by extending the series of racks and pinions to the left of the fixed rack plate 24 as viewed in Figs. 3 and 4. As this left hand series will be the same in construction, arrangement and connection as the right hand series already fully described, I will only briefly describe the left hand series. First at the left, will be a sliding rack plate 61 resting on the lower side 18 of the casing and having two wide racks 61ª and 62 at the right and left ends respectively, and having a large pinion 63 loosely mounted on a stub shaft 64. The wide rack 61ª will engage the small pinion 28 on its lower side and the large pinion 63 on its lower side will engage the narrow rack 66. Next toward the left and sliding on the upper side 17, will be rack plate 65 having a narrow rack 66 at the right end, engaging large pinion 63, and narrow rack 67 at the left end and loosely mounted on stub shaft 69 a small pinion 68 engaging wide rack 62. Next toward the left and also sliding on the upper side 17 will be rack plate 70 having wide rack 71 at the right end engaging small pinion 68, and wide rack 72 at the left end, and loosely mounted on stub shaft 74, a large pinion 73 engaging narrow rack 67. Next toward the left and sliding on the lower side 18, will be rack plate 75 having narrow rack 76 at the right end engaging large pinion 73, and narrow rack 77 at the left end and loosely mounted on stub shaft 79, a small pinion 78 engaging wide rack 72. This left hand series may then be brought to an end by rack plate 80 having a single wide rack 81 at the right end engaging small pinion 78 and on said rack plate 80 by means of stub shaft 84 will be large pinion 83 loosely mounted on said stub shaft and engaging narrow rack 77. The end of this stub shaft 84 will project through a slot 96 in the front 16 of the casing and form a handle 85 on the front of the spacer and at the right end thereof as seen in Fig. 1. The slot 96 will extend from a point near the right end of the casing well toward the center handle 30 in order to allow for the full extent of motion of handle 85. It will be noticed that I have provided only this handle 85 to the right of the handle 30 as seen from the front of the spacer for the reason that the full combination of fractional divisions can be readily obtained by this means and without stub shafts 64, 69, 74 and 79 being extended through the front of the casing. Usually the measurement when obtained is not taken directly from either of the handles to the material but is transmitted from one of the handles by means of an arm or gage to the desired place on the bench or sewing machine or other machine in connection with which the proportional spacer is being used. For this purpose I provide a gage holder 86 slidingly mounted upon the casing of the spacer and in direct connection with whichever of the moving handles may be desired, but which will usually be handle 36, next to the left of the fixed center 30 of the spacer. The front 87, Fig. 6, of the gage holder 86 rests against the front 16 of the casing and is provided with a hole 88 into which fits the handle 36 or any of the other handles on the spacer, while the top 89 and bottom 90 of the gage holder fit slidingly against the upper side 17 and lower side 18 of the casing each of which are cut away for a sufficient distance flush with the inner side of the front 16 of the casing. Fitting into part of the recesses so formed are lugs 91 and 92 secured to the top 89 and bottom 90 respectively of the gage holder and securely holding the same in place upon the casing as the gage holder slides along on the casing. To the top of the sliding gage holder 86 there is secured by screws 93 the gage 95. Provision is also made for securing this gage 95 to the bottom of the gage holder which becomes the top of the gage holder when the spacer is reversed from right to left as may easily be done to have the gage operate upon the right of the center of the spacer instead of at the left of the spacer as herein illustrated.

The proportional spacer here described has five movable rack plates on each side of the fixed rack plate 24, and this arrangement is adapted to proportionally divide any distance within its limit into ten or any less number of equal distances. It is obvious that as the operator moves any handle toward or away from the center handle 30 of the spacer all other handles and stub shafts will be moved toward or away from the center proportionally. From an inspection of the construction, arrangement, proportion and connection of the pinions and racks now described, it is obvious that when handle 36 is moved a given distance toward or away from the center handle 30, the next handle 43 will move twice that distance in the same direction, the handle 49 will move three times that distance in the same direction, the handle 55 will move four times that distance in the same direction and the handle 60 will move five times that distance in the same direction and that the handle 85 being the duplicate of handle 60 on the other end of the spacer will move toward or away from the center as the other handles travel and in the same proportion as handle 60.

The operation of my spacer will be as follows: The operator holds one end of the article, such for instance as an undergarment, the length of which is to be divided into equal parts against the proper handle, which for fifths will be handle 60, and moves that handle from right to left until the distance of that handle from the center or fixed handle 30 equals the space on the underwear, which will be ascertained by the operator holding the other end of the space against the center handle 30. It will now be obvious that the handle 36 will move to a distance one-fifth of that between the fixed handle 30 and the movable handle 60 and this fractional part will be indicated upon the bench or machine by means of the gage 95 which is in sliding coöperation with handle 36. It will be understood of course that the center handle 30 will be set in alinement with the working center on the bench or machine as for instance the needle of a sewing machine. If the division is to be into fourths, the movable handle 55 will be used; if into thirds, the handle 49 will be used; if into halves the handle 43 will be used. It will be noted that the operation thus far, being only to divide from halves to fifths, utilizes only the handles to the left of the fixed handle 30, as viewed in Fig. 1, or in other words, only the right hand series of racks and pinions as viewed in Figs. 3 and 4. If it were necessary to divide only into fifths, the left hand series of racks and pinions as viewed in Figs. 3 and 4 could be dispensed with. If the space is to be proportionally divided into sixths, the article will be measured against the movable handle 85 at the extreme right and the movable handle 36 each of which will be moved toward or away from the center until the distance between them equals the distance to be proportionally divided. It is now obvious that the handle 36 and therefore the gage 95 will indicate the desired fractional part. If the space is to be divided into sevenths, the handles 85 and 43 will be used; if into eighths, the handles 85 and 49 will be used; if into ninths, the handles 85 and 55, will be used; if into tenths, the handles 85 and 60 will be used. If a spacer is desired to divide into smaller fractional parts than tenths, the spacer herein described and illustrated can obviously be enlarged by extending either or both series of racks and pinions as far as needed until the desired fractional part can be obtained after the manner already described.

What I claim as new and desire to secure by Letters Patent is:

1. In a proportional spacer a fixed measuring point, a fixed rack adjacent to said fixed point, a sliding rack plate beyond said fixed rack and having a single rack and a loose pinion engaging said fixed rack, additional successive sliding rack plates therebeyond, each having two racks and a pinion therebetween, the pinion of the first double-racked plate being half the size of the pinion of the said single racked plate and the pinions on the successive plates thereafter being alternately the size of said first mentioned and said second mentioned pinions, each of said pinions engaging on either side the rack of the next adjacent rack plate, slideways for said sliding rack plates, and means for operating said sliding rack plates and indicating the position thereof.

2. In a proportional spacer a fixed revoluble pinion, a fixed rack on either side thereof and on either side a series of successive sliding rack plates, each having two racks and a loose pinion intermediate of the said racks, the first and every alternate one of said last mentioned pinions being twice the size of said fixed pinion and the other pinions being the size of the said fixed pinion, each of said pinions engaging on either side the rack of the next adjacent rack plate, slideways for said rack plates and means for operating said sliding rack plates and indicating the position thereof.

In witness whereof I have affixed my signature, in the presence of two witnesses, this 21st day of January, 1911.

JOSEPH A. FIRSCHING.

Witnesses:
HARRIET WILLIAMS,
JAMES H. MERWIN.

Copies of this patent may be obtained for five cents each, by addressing the "Commissioner of Patents, Washington, D. C."